(12) United States Patent
Hoyer et al.

(10) Patent No.: US 8,454,917 B2
(45) Date of Patent: Jun. 4, 2013

(54) NITROGEN OXIDE STORAGE CATALYTIC CONVERTER FOR USE IN A MOTOR VEHICLE IN A CLOSE-COUPLED POSITION

(75) Inventors: Ruediger Hoyer, Alzenau-Hoerstein (DE); Stephan Eckhoff, Alzenau (DE); Thomas R. Pauly, Oberursel (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 36 days.

(21) Appl. No.: 13/144,238

(22) PCT Filed: Jan. 27, 2010

(86) PCT No.: PCT/EP2010/000453
§ 371 (c)(1),
(2), (4) Date: Jul. 12, 2011

(87) PCT Pub. No.: WO2010/097146
PCT Pub. Date: Sep. 2, 2010

(65) Prior Publication Data
US 2011/0271658 A1    Nov. 10, 2011

(30) Foreign Application Priority Data
Feb. 27, 2009 (DE) .................. 10 2009 010 711

(51) Int. Cl.
*B01D 53/94* (2006.01)
*B01J 23/44* (2006.01)
*B01J 32/00* (2006.01)
*F01N 3/10* (2006.01)
*F01N 3/28* (2006.01)

(52) U.S. Cl.
USPC .......... 423/213.2; 423/213.5; 423/213.7; 502/325; 502/340; 502/341; 502/527.12; 60/299

(58) Field of Classification Search
USPC .......... 502/325, 340, 341, 527.12; 423/213.2, 423/213.5, 213.7; 60/299
See application file for complete search history.

(56) References Cited

U.S. PATENT DOCUMENTS

| 6,338,831 B1 | 1/2002 | Strehkau et al. |
| 6,858,193 B2 | 2/2005 | Ruwisch et al. |
| 6,875,725 B2 | 4/2005 | Lindner et al. |
| 2003/0125202 A1* | 7/2003 | Ruwisch et al. ............. 502/328 |
| 2004/0151645 A1 | 8/2004 | Li |
| 2009/0062117 A1 | 3/2009 | Kluge et al. |

FOREIGN PATENT DOCUMENTS

| EP | 0 945 165 A2 | 9/1999 |
| EP | 1 181 970 A1 | 2/2002 |
| EP | 1 316 354 A1 | 6/2003 |
| EP | 1 317 953 A1 | 6/2003 |
| WO | 2005/092481 A1 | 10/2005 |

OTHER PUBLICATIONS

International Search Report for PCT/EP2010/000453 mailed Aug. 9, 2010 (in English).
PCT Notification of Transmittal of Translation of the International Preliminary Examination Report (Form PCT/IB/338) mailed Sep. 11, 2011 for Application No. PCT/EP2010/000453.
PCT International Preliminary Report on Patentability (Form PCT/IB/373) issued Aug. 30, 2011 for Application No. PCT/EP2010/000453.
English translation of the PCT Written Opinion of the International Searching Authority (Form/ISA/237) issued Aug. 27, 2011 for Application No. PCT/EP2010/000453.

* cited by examiner

*Primary Examiner* — Timothy Vanoy
(74) *Attorney, Agent, or Firm* — Smith Gambrell and Russell, LLP

(57) ABSTRACT

A nitrogen oxide storage catalyst is provided, which has two catalytically active coatings on a support body. The lower coating applied directly to the support body has a nitrogen oxide storage function and includes platinum as a catalytically active component applied to a homogeneous magnesium-aluminum mixed oxide in combination with a nitrogen oxide storage material, in which a nitrogen oxide storage component is likewise present and applied to a homogeneous magnesium-aluminum mixed oxide. The second layer is notable for three-way catalytic activity, and includes palladium applied to aluminum oxide and barium oxide or strontium oxide, but no platinum.

14 Claims, 1 Drawing Sheet

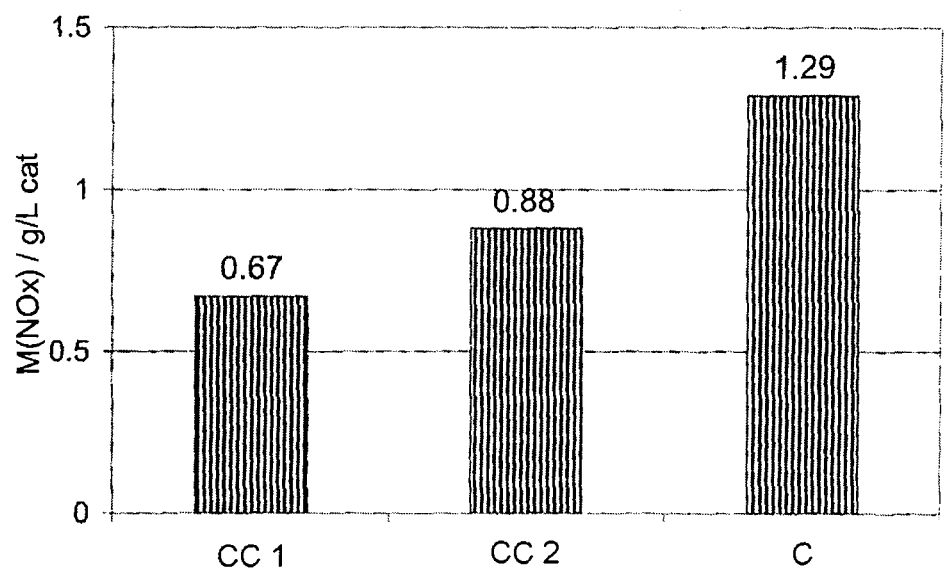

NITROGEN OXIDE STORAGE CATALYTIC CONVERTER FOR USE IN A MOTOR VEHICLE IN A CLOSE-COUPLED POSITION

The invention relates to an automotive exhaust gas catalyst, specifically a nitrogen oxide storage catalyst, for close-coupled use for the cleaning of the exhaust gases of gasoline engines with direct gasoline injection, which are operated predominantly with a lean air/fuel mixture.

The exhaust gas of gasoline engines operated with a predominantly lean air/fuel mixture has, when the engine is at the most common partial load operating points, an excess of oxidizing exhaust gas components such as oxygen ($O_2$) and nitrogen oxides ($NO_x$). Typical contents for such operating points are 3 to 15% by volume of oxygen and up to 1% by volume of nitrogen oxides. Reducing exhaust gas components such as carbon monoxide (CO), hydrocarbons (HC) and possibly hydrogen ($H_2$) are generally not present in a lean exhaust gas in a sufficient amount to be able to sufficiently remove the nitrogen oxides in particular, for example in the case of passage over a conventional three-way catalytic converter. One means of cleaning these exhaust gases, especially of removing the nitrogen oxides ("denoxing"), is the use of nitrogen oxide storage catalysts.

Nitrogen oxide storage catalysts are well known in the prior art. The mode of operation thereof is described in detail in SAE publication SAE 950809. The cleaning effect of the nitrogen oxide storage catalysts is based on the fact that, in a lean operating phase of the engine, the nitrogen oxides are stored predominantly in the form of nitrates by the storage material of the storage catalyst, and, in a subsequent rich operating phase of the engine, the nitrates formed beforehand are decomposed and the nitrogen oxides released are reacted with the reducing exhaust gas fractions over the storage catalyst to give nitrogen, carbon dioxide and water.

There have been proposals of different compositions which are suitable as nitrogen oxide storage catalysts or for use in nitrogen oxide storage catalysts. A distinction is drawn between a nitrogen oxide storage material and the nitrogen oxide storage components. Nitrogen oxide storage components are, for example, the oxides, carbonates or hydroxides of magnesium, calcium, strontium, barium, the alkali metals, the rare earth metals or mixtures thereof, which, due to their basic properties, are capable of forming nitrates with the acidic nitrogen oxides of the exhaust gas and of storing them in this way. A nitrogen oxide storage material consists of the storage components, which are deposited with maximum dispersion on suitable support materials to obtain a high interaction area with the exhaust gas. In addition, nitrogen oxide storage catalysts generally comprise noble metals such as platinum, palladium and/or rhodium as catalytically active components. The task of these catalytically active components is firstly to oxidize nitrogen oxides to $NO_2$, and CO and HC to $CO_2$, under lean conditions; and secondly, during the rich operating phases in which the nitrogen oxide storage catalyst is "cleared out", i.e. regenerated, to reduce $NO_2$ released to nitrogen.

EP 1 317 953 to this applicant discloses a nitrogen oxide storage catalyst which comprises a catalytically active component, for example platinum, on a support material and nitrogen oxide storage components. Materials used as the latter are oxides, carbonates or hydroxides of elements from the group consisting of calcium, strontium, barium, the alkali metals, the rare earth metals or mixtures thereof. The support material used for these nitrogen oxide storage components is, according to EP 1 317 953 A1, a cerium-zirconium mixed oxide. The excellent properties of the nitrogen oxide storage catalyst with regard to the width of the temperature window, the storage efficiency and the aging stability are based essentially on the support material composed of a homogeneous magnesium-aluminum mixed oxide used for the platinum, wherein the magnesium oxide is present in a concentration of 1 to 40% by weight, based on the total weight of the Mg—Al mixed oxide. A further advantageous variant of the storage catalyst is obtained, according to EP 1 317 953 A1, when the platinum-catalyzed Mg—Al mixed oxide is doped by impregnating additionally with cerium oxide or praseodymium oxide.

WO 2005/092481 to this applicant discloses an improved embodiment of the nitrogen oxide storage catalyst described in EP 1 317 953 A1. This differs from the precursor catalyst in particular in that a homogeneous magnesium-aluminum mixed oxide comprising 1 to 30% by weight of magnesium oxide, based on the total weight of the magnesium-aluminum mixed oxide, is also used as support material for the nitrogen oxide storage component.

Both EP 1 317 953 A1 and WO 2005/092481 emphasize the particular suitability of homogeneous magnesium-aluminum mixed oxides with a substoichiometric magnesium oxide content: in both cases, the use of a magnesium-aluminum mixed oxide with a magnesium oxide content of 5 to 28% by weight is specified as preferred. Such a material comprises free aluminum oxide, i.e. aluminum oxide which is not incorporated into the mixed oxide structure and is distributed homogeneously in $MgAl_2O_4$.

In addition, both disclosures emphasize that oxygen-storing materials, for example materials based on cerium oxide, are further important components for use in these catalysts. Due to a change in the oxidation state from +3 to +4 and vice versa, cerium oxide is capable of storing oxygen in lean exhaust gas (oxygen excess) and of releasing oxygen again in rich exhaust gas (oxygen deficiency).

Nitrogen oxide storage catalysts as described in EP 1 317 953 A1 and WO 2005/092481 have the disadvantage that they, as a result of thermal aging processes which greatly impair the performance both of the oxidation component and of the nitrogen oxide storage material, cannot be used readily in a close-coupled position to clean the exhaust gases of gasoline engines with direct gasoline injection operated predominantly with a lean air/fuel mixture. Use in this position, in which the catalysts can be exposed to relatively high exhaust gas temperatures (up to 1000° C.), is possible only when very great amounts of platinum are used as an oxidation component. Typical platinum contents for catalysts of this kind in appropriate applications are 1.5-4 g/l of platinum, based on the volume of the catalyst used, which corresponds to a current expenditure of € 36-100 per liter of catalyst volume. In addition, it is a requirement in such systems to provide, in addition to the close-coupled catalyst, large-volume nitrogen oxide storage catalysts in the underbody of corresponding motor vehicles, in order still to be able to ensure sufficient denoxing effects even when storage capacity has been irreversibly destroyed as a result of the thermal aging of the nitrogen oxide storage material, especially in the close-coupled catalyst.

EP 0 945 165 specifies a storage material for sulfur oxides, which is suitable for use in combination with nitrogen oxide storage catalysts, which increases poisoning resistance of these catalysts to sulfur oxides, and in preferred embodiments can be incorporated into the nitrogen oxide storage catalyst itself. This is an $MgO$—$Al_2O_3$ mixed oxide with a molar ratio of $MgO:Al_2O_3$ of at least 1.1:1, the excess magnesium oxide present therein being distributed homogeneously in the Mg/Al spinel $MgAl_2O_4$ present in excess. Preferred embodiments of this $SO_x$ storage material comprise 1 to 40% by weight of alkaline earth metal oxide (CaO, SrO or BaO) and optionally rare earth oxide, preferably cerium oxide and lanthanum oxide, in an amount of 1 to 40% by weight, based in each case on the total weight of the material.

It has now been found that, completely surprisingly, the use of the storage material described in EP 0 945 165 for sulfur oxides leads to a considerable improvement in the aging stability of the nitrogen oxide storage catalyst precisely when the homogeneous magnesium-aluminum mixed oxide with a molar $MgO:Al_2O_3$ ratio of 1.1:1 is used as support material for the nitrogen oxide storage component. When the composition which thus arises is applied as a coating to an inert support body and a conventional three-way catalytic converter coating is applied thereon, an interaction of the two coatings which is yet to be fully understood results in a possible reduction in the platinum content in the oxidation-active component of the nitrogen oxide storage catalyst by 20 to 80% down to about 0.8-1.2 g/l of platinum, based on the volume of the catalyst used. However, it should be ensured that the three-way catalytic converter coating used does not contain any platinum. An additional platinum content introduced at this point would undermine the saving effect achieved. Preferably, the three-way catalytic converter coating does not contain high proportions of oxygen-storing materials, and more particularly no additional cerium-zirconium mixed oxide. Additional oxygen storage material in relatively large amounts would have an adverse effect on the regeneration properties of the nitrogen oxide storage catalyst.

A suitable three-way catalytic coating has been described, for example, in EP-B-1 181 970 to the applicant, to which reference is hereby made.

The above-described findings and observations result in an inventive nitrogen oxide storage catalyst with the features of claim 1. This catalyst represents another development of the type already described in EP-A-1 317 953 and more particularly in WO 2005/092481. With regard to preferred configurations of individual components, especially of the oxidation- and reduction-active components, and with regard to the production of the first layer of the inventive catalyst, reference is hereby made to these documents.

We believe that the considerable improvement observed in the thermal aging stability of the nitrogen oxide storage material is based on the fact that, in a homogeneous magnesium-aluminum mixed oxide with a magnesium oxide content greater than 28% by weight and not exceeding 30.3% by weight (the upper end point of the range corresponds to a molar ratio of $MgO:Al_2O_3$ of 1.1:1), and especially with the upper end point of this range, an optimal composition has been found, which is virtually resistant with regard to the crucial aging processes in the nitrogen oxide storage material.

For example, thermal stress on the nitrogen oxide storage material can cause a reaction between the nitrogen oxide storage component and the support material, which may be irreversible according to the reaction product. As a result, barium cerate and barium zirconate form in the nitrogen oxide storage catalysts disclosed in EP-A-1 317 953 when a barium compound (BaO, $BaCO_3$ or $Ba(OH)_2$) is present as a nitrogen oxide storage component on a cerium-zirconium mixed oxide. In the nitrogen oxide storage materials described as preferred in WO 2005/092481, the reaction of the barium compound with the free $Al_2O_3$ present in the low-magnesium oxide homogeneous Mg/Al mixed oxide used gives rise to barium aluminate. As a result, barium is unavailable as a nitrate for the storage of nitrogen oxides.

In addition, poisoning by sulfur oxides, which are present in traces in the exhaust gas of lean-burn gasoline engines even when desulfurized fuel is used, leads to the formation of sulfates with the nitrogen oxide storage component, which can be decomposed again and removed only at very high temperatures. This process likewise leads to reduction of the nitrogen oxide storage capacity. For precisely this reason, EP 0 945 165 proposes the use of a "sulfur trap" optionally also integrated into the nitrogen oxide storage catalyst, which is intended to prevent the poisoning of the nitrogen oxide storage material additionally present. A suitable sulfur trap according to this document is $MgO$—$Al_2O_3$ mixed oxide with a molar ratio of $MgO:Al_2O_3$ of at least 1.1:1, especially with $MgO:Al_2O_3 > 2:1$.

We believe that the use of a homogeneous magnesium-aluminum mixed oxide with a magnesium oxide content x where 28% by weight $<x \leq 30.3\%$ by weight, and especially the use of the oxide with a molar $MgO:Al_2O_3$ ratio of 1.1:1, as a support material for the nitrogen oxide storage component achieves several effects. Firstly, this material does not contain any free $Al_2O_3$, and so thermally induced aluminate formation is not possible for the lack of reactant. Secondly, any sulfur oxides present in the exhaust gas are bound in any free MgO present therein. At the same time, the high content of $MgAl_2O_4$, which should behave chemically inertly under these conditions, results in excellent stabilization of the active surface of the nitrogen oxide storage material to thermally induced sintering processes. And furthermore, the use of a further basic component which stores nitrogen oxides and/or sulfur oxides is superfluous. (In contrast, the embodiments disclosed in EP 0 945 165 always describe combinations of sulfur trap and nitrogen oxide storage material.)

According to the invention, the thus obtainable composition which is active as a nitrogen oxide storage catalyst and comprises platinum as a catalytically active component applied to a homogeneous magnesium-aluminum mixed oxide with a magnesium oxide content between 5 and less than 28% by weight, based on the total weight of the magnesium-aluminum mixed oxide, in combination with a nitrogen oxide storage material which comprises a nitrogen oxide storage component applied to a homogeneous magnesium-aluminum mixed oxide with a molar ratio of MgO to $Al_2O_3$ of 1.1:1, is applied to a support body in the form of a coating.

Suitable support bodies are especially ceramic and metallic flow substrates, especially honeycombs, as are customary for such applications and are known in the prior art. However, it is also possible to use wall flow filter substrates composed of cordierite, silicon carbide and aluminum titanate where it is necessary at the same time to solve the problem of removing particulates from the exhaust gas to be cleaned. In such a case, a sensible arrangement of the layers in flow direction of the exhaust gas should be ensured. When the lower coating comprising the nitrogen oxide storage functionalities is introduced into the wall of the filter substrate between inlet and outlet ducts, the three-way catalytically active upper coating must be applied to the wall in the inlet ducts. If, in contrast, the three-way catalytically active coating is introduced into the wall between the inlet and outlet ducts, the lower layer comprising the nitrogen oxide storage functionality must be applied to the wall in the outlet ducts.

According to the target application, the preferred configurations of the composition active as the nitrogen oxide storage catalyst in the lower coating applied directly to the support body may vary.

Thus, suitable nitrogen oxide storage components are oxides, hydroxides, oxide hydroxides, carbonates or hydrogencarbonates of the alkali metals, of the alkaline earth metals, of lanthanum and of lanthanoids (Ce—Lu); preference is given to corresponding compounds of sodium, potassium, strontium, barium and lanthanum. Particular preference is given to the use of oxides, hydroxides, oxide hydroxides and carbonates of strontium and of barium, and mixtures thereof.

Typically, 0.5 to 20% by weight of the nitrogen oxide storage component, calculated as the oxide and based on the total weight of the resulting nitrogen oxide storage material, are applied to the magnesium-aluminum mixed oxide used as the support material. The nitrogen oxide storage material comprises preferably 5 to 18% by weight, more preferably 12 to 17% by weight, of the nitrogen oxide storage components, calculated as the oxide and based on the total weight of the nitrogen oxide storage material.

The magnesium-aluminum mixed oxide which has a molar ratio of MgO to $Al_2O_3$ of 1.1:1 and is used as the support material for the nitrogen oxide storage component may, in preferred embodiments, be coated with cerium oxide or manganese oxide before application of the nitrogen oxide storage component. For this purpose, processes known from the literature may be employed, for example the pore-filling impregnation of the Mg/Al mixed oxide with the aqueous solution of a soluble precursor of these compounds, for example with cerium(III) nitrate solution or manganese(II) nitrate solution, with subsequent calcination. In preferred embodiments, the support material before application of the nitrogen oxide storage component comprises 0.5 to 20% by weight of cerium oxide or manganese oxide ($MnO_2$) or mixtures thereof, based on the total weight of the support material, more preferably 8 to 15% by weight.

According to the invention, the lower coating comprises platinum as the catalytically active component applied to a homogeneous magnesium-aluminum mixed oxide with a magnesium oxide content between 5 and less than 28% by weight, based on the total weight of the magnesium-aluminum mixed oxide. This magnesium-aluminum mixed oxide preferably further comprises 0.5 to 20% by weight of rare earth oxides, especially cerium oxide, based on the total weight of the support material, more preferably 8 to 15% by weight.

This mixed oxide is the support typically for 0.3 to 10% by weight of platinum, based on the resulting total weight of platinum and support material. In addition to platinum, in preferred embodiments, 0.05 to 10% by weight of a further noble metal selected from the group consisting of gold, palladium and rhodium is applied, again based on the resulting total weight of noble metal and support material. Particular preference is given to palladium.

In addition to platinum-containing component and nitrogen oxide storage material, the lower coating applied directly to the support body may comprise constituents which promote the reduction of the nitrogen oxides. Preference is given to using, as such a constituent, rhodium applied to a high-surface area support material, especially aluminum oxide, but other noble metal- and base metal-containing components with like effect are also possible.

According to the final use of the catalyst, it may be necessary even in the composition of the catalyst to establish prerequisites for possible monitoring of the functioning thereof during driving operation ("on-board diagnostics" OBD). For this purpose, it is necessary that the catalyst contains certain amounts of active oxygen storage material. For reasons yet to be explained below, it is disadvantageous to arrange this oxygen storage material in the upper layer. In preferred embodiments, which are intended for use in vehicles with OBD, a cerium/zirconium mixed oxide which may additionally comprise further rare earth metals selected from the group consisting of yttrium, lanthanum, praseodymium, neodymium, samarium and mixtures thereof is therefore additionally added to the lower coating. To provide an oxygen storage activity sufficient for this purpose, this cerium/zirconium mixed oxide is preferably coated with 0.05 to 5% by weight of rhodium or platinum, based on the total weight of noble metal and mixed oxide. According to the invention, a further three-way catalytically active coating is applied to the first, lower coating over the entire substrate length. According to the invention, this further coating comprises palladium applied to aluminum oxide and barium oxide or strontium oxide, but not platinum. Preferred configurations of such coatings and the production thereof are disclosed in EP-B-1 181 970, to which reference is hereby made.

For use as a close-coupled nitrogen oxide storage catalyst, it is additionally advantageous, as already mentioned, when the second layer does not contain any oxygen-storing materials, and more particularly no cerium-zirconium mixed oxide. When additional oxygen storage material is present in relatively large amounts in this second, upper layer, the oxygen stored therein during lean operating phases must first be reduced at the start of the rich phases during which the nitrogen oxide store below should actually be regenerated. Until any oxygen store present in the upper layer is "cleared out" and the oxygen therefrom has been completely reduced, reducing exhaust gas components do not get into the lower layer to the nitrogen oxide store in a sufficient amount, and so the nitrogen oxides desorbed therefrom cannot be reduced at first. This delay before the actual regeneration of the nitrogen oxide store results in prolonging of the rich phase and thus causes undesirable additional consumption of fuel in the motor vehicle.

The upper three-way catalytic coating contributes particularly well to the improved thermal stability of the catalyst when the palladium is introduced and fixed on the aluminum oxide support material using barium hydroxide or strontium hydroxide as the precipitant. A preferred preparation route for a coating suspension for application of the second layer in the inventive catalyst is described in EP-B-1 181 970.

Accordingly, the procedure for preparation of the coating suspension is as follows: aluminum oxide and hydrated barium hydroxide or strontium hydroxide are suspended in water to dissolve barium hydroxide or strontium hydroxide, which leads to a shift of the pH of the suspension into the basic range. Thereafter, an aqueous solution of an acidic precursor of palladium, preferably palladium nitrate, is supplied to the suspension by means of capillary injection while stirring constantly, i.e. palladium nitrate is injected with the aid of capillaries, the openings of which end below the surface of the suspension. At the same time, the suspension is stirred vigorously in order to ensure very rapid and homogeneous distribution of the palladium nitrate in the suspension. After the addition of palladium nitrate has ended, the suspension is stirred for a while longer in order to enable the fixing of palladium and barium in intimate contact with one another on the surface of the aluminum oxide. The addition of the acidic palladium nitrate solution shifts the pH of the suspension into the neutral range. The resulting suspension can be used directly for coating of the support body already coated with the first, lower layer by known processes.

The result of this preparation route is that barium oxide or strontium oxide and palladium have been deposited together in the second layer on the aluminum oxide support material in the resulting particularly preferred embodiments of the inventive catalyst. In addition, the mean particle size of the palladium crystals in the coating produced in such a way is between 3 and 7 nm.

In order to further increase the aging stability of the catalyst, the high-surface area oxides provided as support materials for active components (noble metals; nitrogen oxide storage component) can be used in a highly thermally stable form. Such oxides of high thermal stability differ from the standard high-surface area materials usually in that they are provided with a dopant material which stabilizes the crystal structure. For example, the thermal stability of aluminum oxide is increased significantly by doping with 1 to 10% by weight of rare earth sesquioxide (preferably $La_2O_3$). Corresponding materials have been described in detail in the literature and are well known to those skilled in the art.

The inventive catalyst described above with its preferred embodiments is suitable, due to its exceptionally high aging stability and its innate combined functionality, as a nitrogen oxide storage catalyst and three-way catalyst especially for close-coupled use for the cleaning of the exhaust gases of gasoline engines with direct gasoline injection, which are operated predominantly with a lean air/fuel mixture.

Since it is by no means rare for construction space to be available in the close-coupled position only for small catalytic converters, the performance of which is under some circumstances inadequate, especially in the case of high-volume engines, and there is additionally a need to remove not only carbon monoxide, residual hydrocarbons and nitrogen oxides but possibly also further raw emission constituents, for example particulates, combination with further exhaust gas cleaning units may be helpful and thus preferred.

For example, the additional downstream arrangement of a particulate filter leads to improved cleaning action. The particulate filter may be uncoated or comprise a catalytically active coating. Particular preference is given to particulate filters which comprise a coating with oxidation-catalytic activity, a coating comprising nitrogen oxide storage material or a coating with SCR-catalytic activity.

In addition, the downstream arrangement of a further catalyst for removal of nitrogen oxides may be advantageous. This may be an SCR catalyst or a nitrogen oxide storage catalyst. In the case of use of an SCR catalyst, the reducing agent required for the SCR reaction can be generated during prolonged rich operating phases over the close-coupled inventive catalyst. In some cases, however, the arrangement of a device for introduction of reducing agent into the exhaust gas line before entry into the SCR catalyst, and hence between the inventive close-coupled catalyst and the SCR catalyst, may also be advantageous.

The invention is illustrated hereinafter by a working example. The FIGURE shows:

FIG. 1: comparison of the $NO_x$ storage capacity of an inventive catalyst C and of a prior art catalyst CC at an exhaust gas temperature of 350° C., after thermal aging at 950° C. in air for a duration of 24 hours

COMPARATIVE EXAMPLE 1

A catalyst was produced in accordance with WO 2005/092481. For this purpose, a homogeneous magnesium-aluminum mixed oxide with a weight ratio of the oxidic components $Al_2O_3$:MgO=80:20 was first doped with cerium oxide by impregnating with cerium nitrate and then calcining. In the doped support material, the oxidic components were present with the following weight ratio relative to one another:

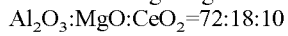

150.4 g of the finished support material were impregnated with an aqueous solution of hexahydroxoplatinic acid ($H_2Pt(OH)_6$) dissolved in ethanolamine, dried and calcined at 500° C. under air, such that it contained 2.4 g of platinum.

To produce $NO_x$ storage material, 62.5 g of the same support material were impregnated with barium acetate and then calcined at 500° C. for a duration of 2 hours. The finished $NO_x$ storage material contained 12.5 g of barium, calculated as the oxide.

To produce a further $NO_x$ storage material according to EP 1 317 953, 65.3 g of a homogeneous, lanthum sesquioxide-doped cerium/zirconium mixed oxide ($CeO_2$:$ZrO_2$:$La_2O_3$=86:10:4) were impregnated with barium acetate, dried and then calcined at 500° C. for a duration of 2 hours. The finished $NO_x$ storage material contained 13.01 g of barium, calculated as the oxide.

In addition, a rhodium-containing powder was also produced by impregnation of 7.7 g of aluminum oxide stabilized with 4% by weight of $La_2O_3$ with rhodium nitrate in nitric acid solution, drying and subsequent calcination at 500° C. for a duration of 2 hours. The finished powder contained 0.29 g of rhodium.

The finished powders were suspended together with 5 g of MgO as magnesium acetate solution and 0.82 g of palladium as palladium nitrate solution in water. The suspension was ground to a particle size of 3 to 5 μm ($d_{50}$) and applied by means of a dipping process to a commercial cordierite honeycomb with 62 cells per square centimeter. The honeycomb coated in this way was dried at 120° C. in a drying cabinet and then calcined at 500° C. for a duration of 2 hours.

EXAMPLE

To produce an inventive catalyst, a homogeneous magnesium-aluminum mixed oxide with a weight ratio of the oxidic components $Al_2O_3$:MgO=80:20 was again doped with cerium oxide by impregnating with cerium nitrate and then calcining. In the doped support material, the oxidic components were present with the following weight ratio relative to one another:

65.15 g of the finished support material were impregnated with an aqueous solution of hexahydroxoplatinic acid ($H_2Pt(OH)_6$) dissolved in ethanolamine, dried and calcined at 500° C. under air, such that it contained 1.06 g of platinum.

To produce an NO storage material, a homogeneous magnesium-aluminum mixed oxide containing 30.3% by weight of MgO (corresponding to a molar ratio of MgO:$Al_2O_3$ of 1.1:1) was doped with cerium oxide by impregnating with cerium nitrate and then calcining. In the resulting doped support material, the oxidic components were present with the following weight ratio relative to one another:

108.3 g of the finished support material were impregnated with aqueous barium acetate solution and then calcined at 500° C. for a duration of 2 hours. The finished $NO_x$ support material contained 21.7 g of barium, calculated as the oxide.

In addition, a rhodium-containing powder was also produced by impregnating 3 g of aluminum oxide stabilized with 4% by weight of $La_2O_3$ with rhodium nitrate in nitric acid solution, drying and then calcining at 500° C. for a duration of 2 hours. The finished powder contained 0.12 g of rhodium.

The finished powders were suspended together with 3 g of MgO as magnesium acetate solution and 0.106 g of palladium as palladium nitrate solution in water. The suspension was ground to a particle size of 3 to 5 μm ($d_{50}$) and applied by means of a dipping process to a commercial cordierite honeycomb with 62 cells per square centimeter. The coated honeycomb was dried at 120° C. in a drying cabinet and then calcined at 500° C. for a duration of 2 hours.

A second coating was applied to the coated honeycomb produced in this way. For this purpose, an aqueous coating suspension was first produced, which comprised 85.18 g of aluminum oxide stabilized with 3% by weight of $La_2O_3$, 8 g of barium, calculated as the oxide, in the form of barium hydroxide octahydrate, and 2.83 g of palladium in the form of palladium nitrate. This coating suspension was likewise ground to a particle size of 3 to 5 μm ($d_{50}$) and applied by means of a conventional dipping process to the already singly coated honeycomb. This was followed by drying again at 120° C. in a drying cabinet followed by calcination under air at 500° C. for a duration of 2 hours.

The inventive catalyst produced in the example had reduced noble metal costs compared to the prior art catalyst from comparative example 1. According to current noble metal prices, the cost saving was about €30 per liter of catalyst volume.

COMPARATIVE EXAMPLE 2

A further comparative catalyst was produced, which differed from the inventive catalyst described in the example merely in that the $NO_x$ storage material was produced using a homogeneous magnesium-aluminum mixed oxide with a weight ratio of the oxidic components $Al_2O_3$:MgO=80:20, which had been doped with cerium oxide by impregnating the cerium nitrate and then calcining. To produce the $NO_x$ storage material, the support material used was thus again one in which the oxidic components were present with the following weight ratio relative to one another:

$Al_2O_3$:MgO:$CeO_2$=72:18:10

Otherwise, the production of the comparative catalyst corresponded entirely to the method outlined in the example.

Specimens were taken from the coated honeycombs produced in the example and in the comparative examples in the form of drill cores with a diameter of 25.4 mm and a length of 76.2 mm.

These drill cores (CC1=drill core from the prior art catalyst produced in comparative example 1; CC2=drill core of the comparative catalyst produced in comparative example 2; C=drill core from the inventive catalyst produced in the example) were treated thermally in an oven under air at 950° C. for a duration of 24 hours, and thus subjected to synthetic thermal aging. Subsequently, the specimens were examined in a laboratory model gas system.

Test Conditions:

In a laboratory model gas system, the nitrogen oxide storage capacity of the thermally pretreated ("aged") specimens CC1 (prior art catalyst from comparative example 1), CC2 (comparative catalyst from comparative example 2) and C (inventive catalyst from example) was determined. For this purpose, the specimens were incorporated successively into the reactor of the model gas system and subjected to the following four-stage test procedure:

1. heating to 550° C. at a heating rate of 60° per minute with periodically changing rich and lean exhaust gas compositions (rich/lean cycles) without NO at a gas hourly space velocity GHSV of 30 000 $h^{-1}$;
2. baking of the catalyst at 550° C. with periodically changing rich and lean exhaust gas compositions (rich/lean cycles) without $NO_x$ at a gas hourly space velocity GHSV of 30 000 $h^{-1}$;

in steps 1.) and 2.), the following exhaust gas compositions were established:

| Component in: | Lean operation | Rich operation |
|---|---|---|
| CO [% by vol.] | 0 | 4 |
| $H_2$ [% by vol.] | 0 | 1.3 |
| $O_2$ [% by vol.] | 8 | 0 |
| NO [ppmV] | 0 | 0 |
| $CO_2$ [ppmV] | 10 | 10 |
| $H_2O$ [% by vol.] | 10 | 10 |
| Time [sec] | 80 | 10 |

3. cooling of the catalyst under nitrogen to a temperature of 350° C. with a temperature ramp of 40° per minute at a GHSV of 30 000 $h^{-1}$;
4. loading of the catalyst with nitrogen oxides until complete saturation in the lean exhaust gas at a gas hourly space velocity GHSV of 30 000 $h^{-1}$ over a period of 40 minutes; during this time, the following exhaust gas composition was established:

| Component in: | Lean operation |
|---|---|
| CO [% by vol.] | 0 |
| $H_2$ [% by vol.] | 0 |
| $O_2$ [% by vol.] | 8 |
| NO [ppmV] | 500 |
| $CO_2$ [ppmV] | 10 |
| $H_2O$ [% by vol.] | 10 |

After passing through the fourth stage of the test procedure, the nitrogen oxide storage capacity of the specimens was calculated from the nitrogen oxide concentrations in the exhaust gas established during the fourth stage upstream of catalyst and measured downstream of catalyst, as follows:

$$m(NO_x) = \int_{t=0min}^{t=40min} \frac{(c^{IN}(NO_x) - c^{OUT}(NO_x)) \cdot \dot{V} \cdot M_{NO_2}}{V_m \cdot V_{cat}}$$

In this equation:
$m(NO_x)$ is the amount of $NO_x$ stored in the catalyst in grams per liter of catalyst volume [g/l]
$c^{IN}(NO_x)$ is the $NO_x$ concentration in the exhaust gas before entering the catalyst
$c^{OUT}(NO_x)$ is the $NO_x$ concentration in the exhaust gas after leaving the catalyst
$\dot{V}$ is the exhaust gas volume flow rate established
$M_{NO_2}$ is the molar mass of $NO_2$
$V_m$ is the molar volume
$V_{cat}$ is the volume of the catalyst specimen.

The result of these studies is shown in FIG. 1.

FIG. 1 shows the $NO_x$ storage capacity of the inventive catalyst C compared to CC1, the prior art catalyst from comparative example 1, and compared to a comparative catalyst CC2, which differs from the inventive catalyst merely in that the storage component has been applied to a homogeneous magnesium-aluminum mixed oxide with a molar ratio of MgO to $Al_2O_3$ of less than 1.1:1. The $NO_x$ storage capacities shown were observed at an exhaust gas temperature of 350° C. after the catalysts had been thermally pretreated ("aged") at 950° C. in air for a duration of 24 hours. After aging, the inventive catalyst exhibits almost twice as high a nitrogen oxide storage capacity as the prior art catalyst CC1 and hence a much lower level of thermal damage. At the same time, the inventive catalyst has considerably lower noble metal costs per liter of catalyst volume.

The inventive catalyst C also exhibits a considerably better $NO_x$ storage capacity than the comparative catalyst CC2, in which merely a different homogeneous magnesium-aluminum mixed oxide was used as the support for the nitrogen oxide storage component. This result demonstrates that the improvement in the aging stability observed over the inventive catalyst is determined crucially by the selection of the homogeneous magnesium-aluminum mixed oxide which is used as support material for the $NO_x$ storage component. It also demonstrates that the observed improvement in aging stability which enables the noble metal savings described is not obtainable by simply combining a nitrogen oxide storage coating according to EP 1 317 953 or according to WO 2005/092481 with a conventional three-way catalytically active coating according to EP 1 181 970.

The invention claimed is:

1. A nitrogen oxide storage catalyst comprising at least two catalytically active coatings on a support body,
    the lower coating applied directly to the support body comprising platinum as a catalytically active component applied to a homogeneous magnesium-aluminum mixed oxide with a magnesium oxide content between 5 and less than 28% by weight, based on the total weight of the magnesium-aluminum mixed oxide, in combination with a nitrogen oxide storage material
    which comprises a nitrogen oxide storage component applied to a homogeneous magnesium-aluminum mixed oxide with a molar ratio of MgO to $Al_2O_3$ of 1.1:1, wherein
    the second layer applied thereto comprises palladium applied to aluminum oxide and barium oxide or strontium oxide, but not platinum.

2. The nitrogen oxide storage catalyst as claimed in claim 1, wherein
    the second layer does not comprise any oxygen-storing materials.

3. The nitrogen oxide storage catalyst as claimed in claim 1, wherein
    in the second layer barium oxide or strontium oxide and palladium have been deposited together on the aluminum oxide support material.

4. The nitrogen oxide storage catalyst as claimed in claim 1, wherein
    the nitrogen oxide storage components present are oxides, hydroxides, oxide hydroxides or carbonates of strontium or barium, or mixtures thereof.

5. The nitrogen oxide storage catalyst as claimed in claim 4, wherein
    the magnesium-aluminum mixed oxide which has a molar ratio of MgO to $Al_2O_3$ of 1.1:1 and is used as support material for the nitrogen oxide storage component further comprises 0.5 to 20% by weight of cerium oxide or manganese oxide ($MnO_2$) or mixtures thereof, based on the total weight of the support material.

6. The nitrogen oxide storage catalyst as claimed in claim 4, wherein
    the magnesium-aluminum mixed oxide used as support material for platinum further comprises 0.5 to 20% by weight of cerium oxide, based on the total weight of the support material.

7. The nitrogen oxide storage catalyst as claimed in claim 6, wherein
    0.05 to 10% by weight of a further noble metal selected from gold, palladium and rhodium has additionally been applied to the magnesium-aluminum mixed oxide used as support material for platinum, based on the resulting total weight of noble metal and support material.

8. The nitrogen oxide storage catalyst as claimed in claim 1, wherein
    the lower coating applied directly to the support body additionally comprises a cerium/zirconium mixed oxide which has been coated with 0.05 to 5% by weight of rhodium or platinum and may comprise further rare earth metals selected from the group consisting of yttrium, lanthanum, praseodymium, neodymium, samarium and mixtures thereof, where the content stated is based on the total weight of noble metal and mixed oxide.

9. A process for cleaning the exhaust gases of gasoline engines with direct gasoline injection which are operated predominantly with a lean air/fuel mixture, by contacting the exhaust gases with a catalyst as claimed in claim 1 arranged in a close-coupled position.

10. The process as claimed in claim 9, wherein an uncoated particulate filter or a particulate filter comprising a catalytically active coating is arranged downstream of a catalyst as claimed in claim 1.

11. The process as claimed in claim 9, wherein an SCR catalyst is arranged downstream of a catalyst as claimed in claim 1.

12. The process as claimed in claim 9, wherein a nitrogen oxide storage catalyst is arranged downstream of a catalyst as claimed in claim 1.

13. The process as claimed in claim 11 wherein an apparatus for introducing a reducing agent into the exhaust gas line is positioned upstream of entry to the SCR catalyst and downstream of the catalyst as claimed in claim 1.

14. The nitrogen oxide storage catalyst as claimed in claim 1 wherein the second layer does not comprise a cerium-zirconium mixed oxide.

* * * * *